United States Patent [19]

Franz et al.

[11] 4,449,405

[45] May 22, 1984

[54] ROD-LIKE PROBE FOR THE CAPACITIVE MEASUREMENT OF THE LEVEL IN A CONTAINER

[75] Inventors: Han-Jürgen Franz, Schopfheim; Volker Dreyer, Lörrah-Haagen, both of Fed. Rep. of Germany

[73] Assignee: Endress u. Hauser GmbH u. Co., Maulburg, Fed. Rep. of Germany

[21] Appl. No.: 283,209

[22] Filed: Jul. 14, 1981

[30] Foreign Application Priority Data

Aug. 1, 1980 [DE] Fed. Rep. of Germany ....... 3029352

[51] Int. Cl.³ ............................................. G01F 23/26
[52] U.S. Cl. .................................. 73/304 C; 361/284; 324/61 P
[58] Field of Search ...................... 73/304 C; 361/284; 324/61 P; 200/61.4, 190; 340/620, 652

[56] References Cited

U.S. PATENT DOCUMENTS 2,375,084  5/1945  Coroniti ............................. 361/284
3,902,157  8/1975  Kita .................................... 200/61.4
4,204,190  5/1980  Wiley ................................ 200/61.4

Primary Examiner—Charles Frankfort
Assistant Examiner—Denis E. Corr
Attorney, Agent, or Firm—Gerald J. Ferguson; Joseph J. Baker

[57] ABSTRACT

Disclosed is a capacitance level measuring device comprised of a container whose level is to be measured and a probe inserted into and spaced from the container. The capacitance between the probe and container varies in relation to the level in the container. A capacitance measuring circuit determines the capacitance between the probe and container and thus indicates the level in the container. The integrity of the probe is verified by constructing the probe so as to include it in a series circuit, as well as the capacitance measuring circuit, and a lack of continuity in the probe is indicative of questionable probe integrity. The question as to the probe's integrity would indicate a questionable level indication from the capacitance measuring circuit. Various probe constructions are also disclosed.

15 Claims, 9 Drawing Figures

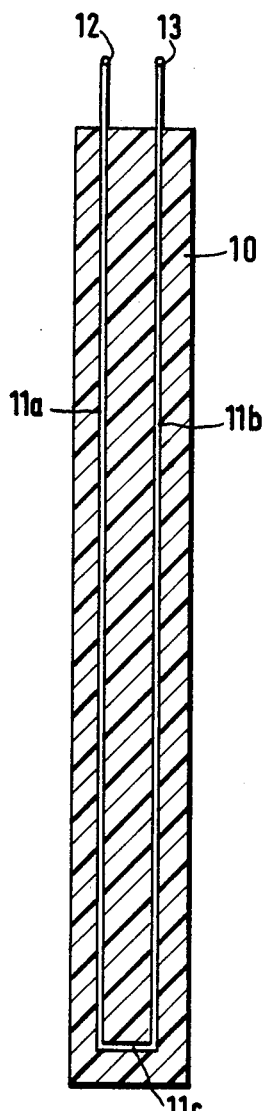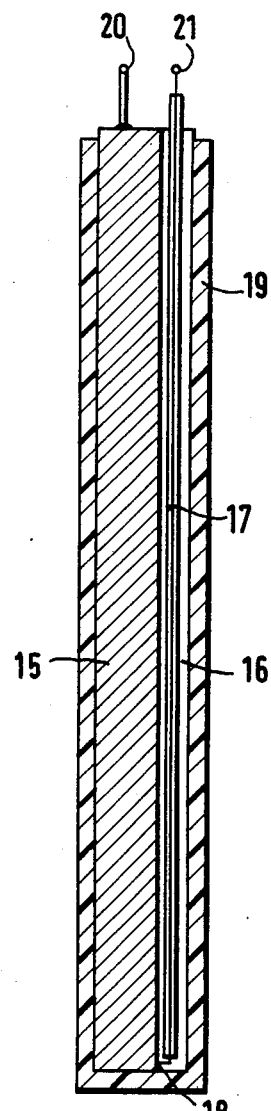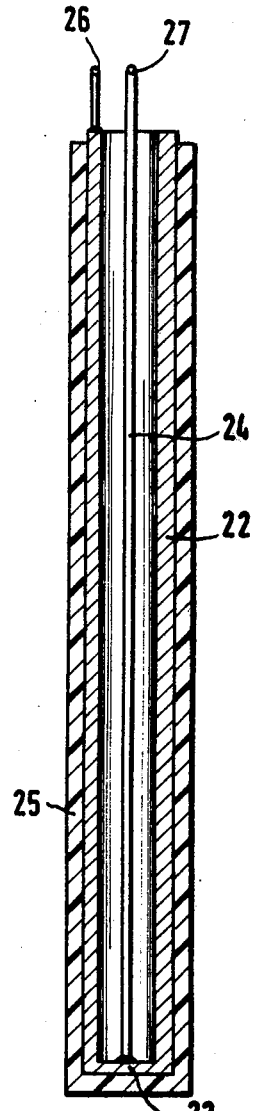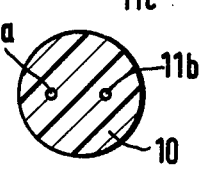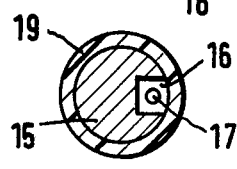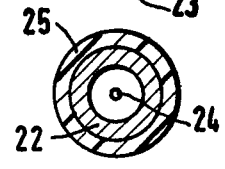

ROD-LIKE PROBE FOR THE CAPACITIVE MEASUREMENT OF THE LEVEL IN A CONTAINER

BACKGROUND AND SUMMARY OF THE INVENTION

The present invention relates to a rod-like probe for the capacitive measurement of the level in a container, the probe forming the one electrode and the container the other electrode of a capacitor whose capacitance depends on the level in the container.

Rod-like probes of this type are used either for continuous level measurement, then extending substantially over the entire height of the container and consequently having a considerable length, or for determining when certain limit levels are reached, when they may be shorter. In both cases the problem is encountered that a breakage or tearing away of the probe is difficult to detect and leads to erroneous indication of the level.

The objective of the present invention is to provide a rod-like probe of the type mentioned at the beginning which permits reliable detection of probe detachment or breaking away.

According to the invention this is achieved in that the probe includes two electrical conductors insulated from each other which are electrically connected together at the ends facing the container interior and the ends of which remote from the container interior are provided with electrical terminals separate from each other.

In the rod-like probe according to the invention the two terminals of the probe conductors for the capacitance measurement, which is carried out with high-frequency alternating current, are at the same potential so that the inductance of the loop is of no consequence. The probe behaves like a simple rod. However, the loop existing between the two terminals affords the possibility of checking the satisfactory direct electrical connection between the two terminals during operation. When the probe is broken away this electrical direct connection is interrupted so that the check reliably detects the fault.

BRIEF DESCRIPTION OF THE DRAWINGS

The foregoing and other objects of the features of the present invention will become more apparent upon a consideration of the following description taken in conjunction with the accompanying drawings, wherein:

FIGS. 2A, 2B, 3A, 3B, 4A and 4B are schematic longitudinal and cross-sectional views of various embodiments of the rod-like probe according to the invention.

DETAILED DESCRIPTION OF THE INVENTION

Figure 1:
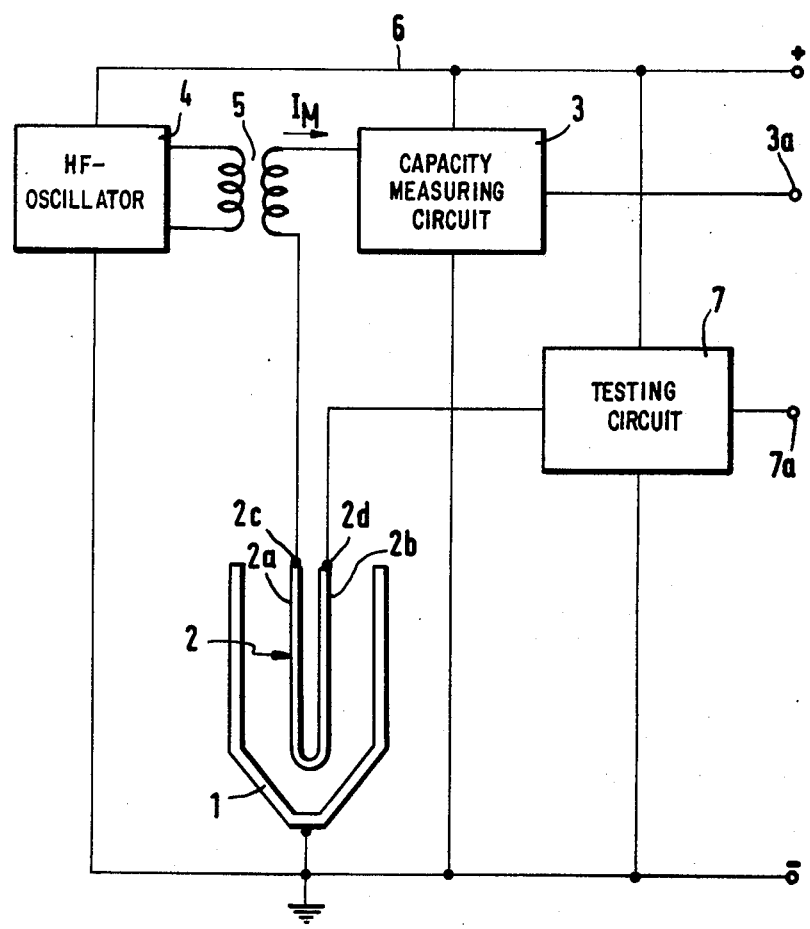
FIG. 1 is a schematic illustration of an arrangement for capacitive level measurement with a rod-like probe according to the invention.

FIG. 1 shows diagrammatically an arrangement for the capacitive measurement of the level in a container 1 which contains a liquid or a bulk material. Disposed in the container 1 is a rod-like probe 2 which forms the one electrode of a capacitor whose other electrode is formed by the container 1, the dielectric between the two electrodes being formed partially by air and partially by the filling material. The capacitance between the container 1 and the probe 2 thus varies in dependence upon the level in the container. When the rod-like probe extends over the entire height of the container a continuous measurement of the level is possible. If the arrangement serves as limit switch which is only to detect when a predetermined minimum or maximum level is reached the rod-like probe 2 is relatively short and is mounted at the height of the level to be detected.

Connected to the probe 2 is a capacitance measuring circuit 3 which furnishes an output signal which depends on the capacitance between the probe 2 and the container 1. Numerous suitable capacitance measuring arrangements are known which can be used in the present case. As example, it will be assumed that an HF oscillator 4 is provided which produces an HF oscillation of fixed frequency which is applied via a transformer 5 to the rod-like probe and the capacitance measuring circuit 3. The current supply of the oscillator 4 and the capacitance measuring circuit 3 is between a conductor 6 which is connected to the positive terminal of a DC voltage source and the circuit ground which is connected to the negative terminal of the DC voltage source and to which the container 1 is also connected. The capacitor formed by the container 1 and the probe 2 is thus in series for alterating current with the secondary winding of the transformer 5. The alternating current $I_M$ flowing through said circuit depends, with fixed oscillator frequency and constant output voltage of the oscillator, only on the capacitance between the probe 2 and the container 1. The capacitance measuring circuit 3 may be so constructed that it converts said alternating current to a DC voltage proportional thereto which is furnished at the output 3a as measuring signal. This measuring signal can be transmitted in any suitable manner to an evaluation means.

The particular feature of the arrangement illustrated resides in that the probe 2 is not constructed as simple rod but in "hairpin" form with two parallel conductors 2a, 2b which are electrically connected together at the end facing the container interior and at the ends projecting from the container each have their own electrical terminal 2c and 2d. The terminal 2c is connected to the secondary winding of the transformer 5 whilst to the terminal 2d a test circuit 7 is connected which is so constructed that it can monitor the electrical continuity of the circuit extending between the terminals 2c and 2d. For example, the arrangement may be such that the capacitance measuring circuit allows a direct current to flow via the secondary winding 2 and the probe conductors 2a, 2b to the test circuit 7. The test circuit 7 can determine whether this direct current is interrupted or has dropped beneath a predetermined minimum value. In each of these cases it furnishes a signal at its output 7a.

It is possible with the arrangement described to check whether the probe has broken off or is damaged in a manner which impairs proper functioning. In the case of a probe which has broken away the direct current path outlined above is completely interrupted. The same thing occurs when the probe is not completely broken away but when for example there is a fine crack which interrupts the electrical continuity of the probe conductor. In all these cases the test circuit 7 furnishes at its output 7a a signal which indicates the presence of a fault and can possibly be employed to initiate safety measures.

FIGS. 2A, 2B, 3A, 3B, 4A and 4B show diagrammatically various embodiments of rod-like probes which can be used in the arrangement of FIG. 1 instead of the probe 2.

The probe of FIG. 2A and 2B consists of a rod-like body 10 of insulating material into which a wire 11 is embedded which is bent in hairpin manner and which comprises two sections 11a, 11b which extend practically over the entire length of the body 10 and which at the end facing the container interior are connected together by a short transverse portion 11c. At the ends of the two wire sections 11a, 11b projecting upwardly out of the body 10 two electrical terminals 12, 13 separate from each other are disposed. This embodiment of the probe permits particularly simple and cheap production; furthermore the wire is completely electrically insulated by the insulating material from the filling material disposed in the container and protected from chemical effects. The mechanical strength of said probe depends substantially on the insulating material of the body 10 so that this form of the probe is suitable in particular for uses where the probe is subjected to only small mechanical stresses.

FIG. 3A and 3B illustrates a rod-like probe which has a greater mechanical strength. It includes a solid metal rod 15 which occupies the major part of the probe cross-section. Milled into the metal rod 15 over the entire length thereof is a longitudinal groove 16 into which an insulated electrical wire 17 is embedded which is connected at 18 at the lower end facing the container interior electrically to the metal rod 15. An insulating sheath 19 surrounds the entire peripheral surface and the lower end face of the metal rod 15 as well as the groove 16 and the wire 17 disposed therein. At the upper free end face of the metal rod 15 there is an electrical terminal 20; a second terminal 21 is disposed at the end of the wire 17 projecting upwardly from the longitudinal groove 16.

The probe illustrated in FIG. 4A and 4B comprises a metal tube 22 which is sealed at the lower end facing the container interior by a metal end wall 23 whilst the upper end is open. A metal wire or metal rod 24 extends within the metal tube along the axis and is connected at the lower end electrically to the end wall 23 whilst the upper end projects from the open end of the metal tube 22. Apart from the connection of the lower end to the end wall 23 the metal wire or metal rod 24 is insulated over its entire length from the metal tube 22. If, as illustrated in FIG. 4, the metal wire or metal rod 24 has an external diameter which is substantially smaller than the internal diameter of the metal tube 22 and if the metal wire or metal rod 24 has adequate stiffness, the air intermediate space in the interior of the metal tube 22 provides adequate insulation. Otherwise, the metal wire or metal rod 24 may be coated with an insulating layer or the entire remaining cavity of the metal tube 22 can be filled with insulating material. An insulating sheath 25 surrounds the entire peripheral surface of the metal tube 22 and the outer surface of the end wall 23. Disposed at the upper end of the metal tube 22 is an electrical terminal 26 and a second electrical terminal 27 is disposed at the end of the metal wire or metal rod 24 projecting from the metal tube.

Figure 5:
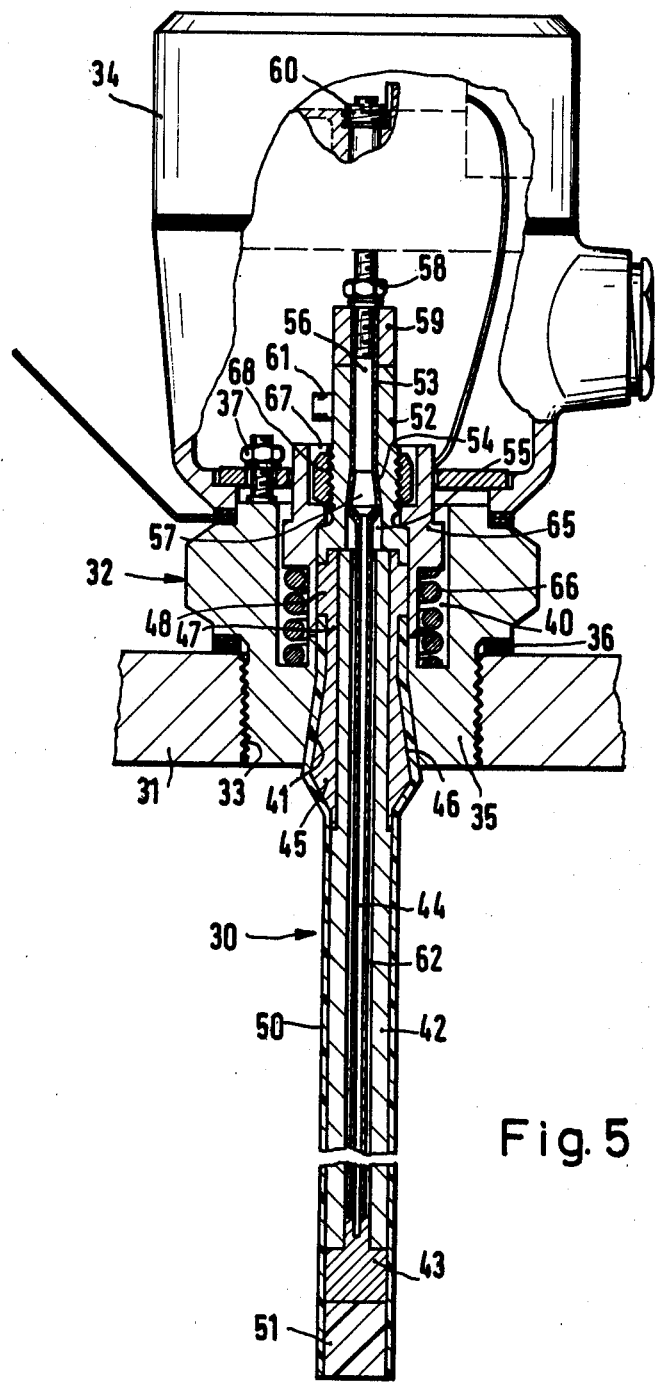
FIG. 5 is a sectional view of a practical embodiment of the rod-like probe and FIG. 6 is a sectional view of another practical embodiment of the rod-like probe.

FIG. 5 shows a practical example of embodiment of a rod probe 30 which is made according to the principle illustrated in FIG. 4 and serves to measure the level in a container, only a portion of the container wall 31 being illustrated, forming the upper closure. The rod probe 30 is secured by means of a securing and lead-through means 32 in an opening 33 of the container wall 31. The components of the electronic measuring and test circuit, i.e. for example the capacitance measuring circuit 3, the oscillator 4 and the test circuit 7 of FIG. 1, are accommodated in a housing 34 disposed outside the container. The securing and lead-through means 32 comprise a screw-in member 35 whose lower portion is cylindrical and comprises an external thread whilst the upper portion is formed as hexagonal head. The screw-in member 35 is screwed into the internally threaded opening 33 of the container wall 31 with interposition of a sealing ring 36.

The housing 34 is mounted on the top of the screw-in member 35 by means of screws 37.

In the upper portion of the screw-in member 35, constructed as hexagonal head, a central recess 40 is formed. The lower cylindrical portion of the screw-in member 35 has a central opening 41 which is cylindrical in the upper portion, the latter being followed downwardly by a conical portion which widens towards the interior of the container.

The rod probe is inserted into the centre opening 41 of the screw-in member 35.

The actual rod probe comprises, as in the case of FIG. 4A and 4B, a metal tube 42 which is sealed at the lower end by a welded-on metallic closure member 43. A metal rod 44 extends axially through the hollow interior of the metal tube 42 and the lower end of said rod 44 is mechanically and electrically connected to the closure member 43 whilst the upper end projects out of the metal tube 42.

The upper end portion of the metal tube 42 has a reduced diameter and is secured in the axial bore of an intermediate member 45. The lower portion of the intermediate member comprises an upwardly tapering conical outer surface 46 which is adapted to the conical inner surface of the centre opening 41 of the screw-in member 35. The conical portion 46 merges into a short cylindrical portion 47 which is followed by a cylindrical portion 48 of somewhat larger diameter so that a shoulder is formed between the two cylindrical portions 47 and 48.

An insulating sheath 50 surrounds the lower portion of the intermediate member 45, in particular the conical portion 46 and the adjoining cylindrical portion 47 up to the shoulder, as well as the entire outer surface of the metal tube 42 and the metallic closure member 43. The insulating sheath 50 projects downwardly somewhat beyond the closure member 43 and in this projecting portion a plug 51 of insulating material is inserted. The insulating sheath 50 and the plug 51 preferably consist of polytetrafluoroethylene.

The upper side of the intermediate member 45 is flush with the upper end face of the metal tube 42 and welded to said face. On the common upper side of the intermediate member 45 and the metal tube 42 a tubular metallic extension sleeve 52 is secured coaxially by welding. The upper portion of the centre opening 53 of the extension sleeve 52 is cylindrical. This cylindrical portion is followed downwardly by a conical portion 54 which widens towards the container interior and which finally merges into a cylindrical portion 55 of greater diameter.

The upper end of the metal rod 44 is threaded and screwed into a corresponding threaded bore at the lower end of a pin 56. The lower end portion 57 of the pin 56 has a conical form adapted to the conical portion 54 of the centre opening 53. Disposed at the upper portion of the pin 56 projecting from the extension sleeve 52 is an outer thread onto which a nut 58 is screwed which engages with the upper side of a ceramic bushing 59 which rests on the extension sleeve 52.

Attached to the end of the closure pin 56 projecting upwardly into the housing 34 is an electrical terminal 60 which forms one of the two terminals of the rod probe. The second terminal of the probe is formed by a terminal 61 which is mounted on the outside of the extension sleeve 52 and via the latter is in electrical connection with the metal tube 42.

An insulating sheath 62 surrounds the entire metal rod 44 and the portion of the pin 56 lying within the extension sleeve 52 and the ceramic bushing 59. Said insulating sheath is perferably a shrunk sheath of polytetrafluoroethylene.

An insulating bushing 65 disposed in the recess 40 surrounds the end portion of the intermediate member 45 projecting from the centre opening 41 and the lower portion of the extension sleeve 52. A helical pressure spring 66 is inserted between the bottom of the recess 40 and a shoulder formed on the insulating bushing 65. In the upper portion of the insulating bushing 65 a widened recess 67 is formed which surrounds a nut 68 which is screwed onto an external thread formed on the outside of the extension sleeve 52 substantially at the level of the conical portion 54.

The helical pressure spring 66 is compressed by screwing on the nut 68 over the insulating bushing 65, producing an upwardly acting force which tends to pull the intermediate member 45 upwardly into the centre opening of the screw-in member 35. As a result, the conical faces 41 and 46 on the screw-in member 35 and the intermediate member 45 respectively and the insulating sheath 50 therebetween are pressed together. In this manner the rod probe is held to produce a gas-tight and pressure-tight sealing in the screw-in member 35.

A corresponding sealing is produced between the conical portions 54 and 57 of the extension sleeve 52 and pin 56 with interposition of the insulating sheath 62 by tightening the nut 58.

The pressure-tight seals obtained remain when either the entire probe rod 30 in the interior of the container breaks off or when the metal rod 44 in the interior of the metal tube 42 breaks off. The threads at the upper end of the metal rod 44, with which the latter is screwed into the lower end of the pin 56, form a predetermined breakage point so that breaking away of the metal rod takes place practically only directly beneath the conical portion 57.

Any breaking away in the manner outlined can be immediately detected by the interruption of the electrical direct circuit between the terminals 60 and 61. The construction outlined avoids aggressive media penetrating from the container interior into the interior of the housing 34 before the damage is repaired.

The probe rod illustrated in FIG. 5 may have any desired length, as indicated by the break. If it is used only to determine when a predetermined maximum level is reached it may be relatively short; if on the other hand it is used for continuous level measurement it must extend practically over the entire height of the container.

Figure 6:
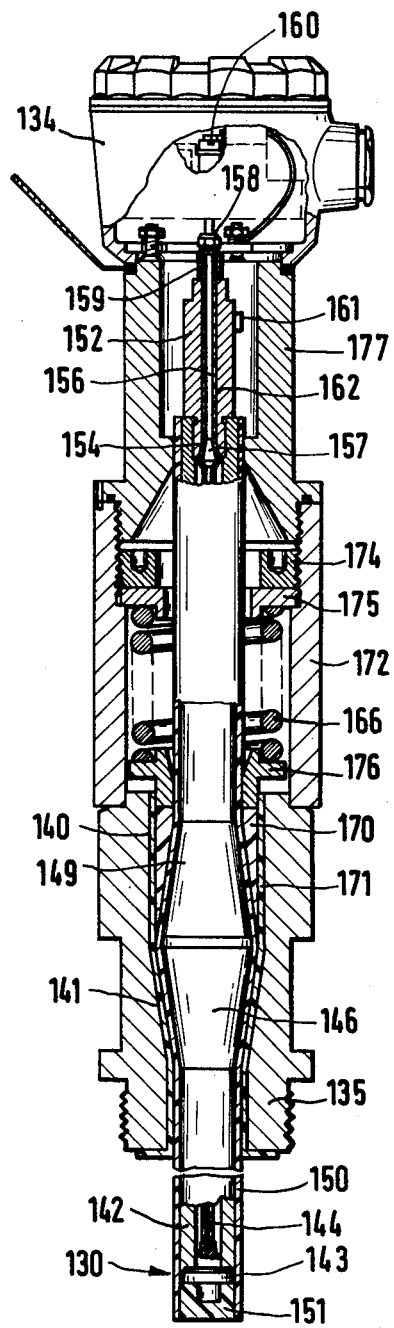

FIG. 6 illustrates another embodiment of the rod probe which is also made in accordance with the principle of FIG. 4A and 4B and differs from the embodiment of FIG. 5 mainly as regards the mounting in the screw-in member. Corresponding parts are provided with the same number but increased by 100 compared with those in FIG. 5.

The actual probe rod 130 again consists of a metal tube 142 whose lower end is sealed by a metallic closure member 143 and a metal rod 144 which is disposed in the interior of the metal tube 142 and which is connected at the lower end electrically to the closure member 143. Furthermore, once again an insulating sheath 150 is provided which covers the entire outer surface of the metal tube as well as a plug 151 which seals the lower end of the insulating sheath. The metal rod 144 is screwed at the upper end to a pin 156 which is led through the centre opening of an extension sleeve 152 mounted on the upper end of the metal tube 142. The lower end portion 157 of the pin 156 is again made conical and is seated with interposition of the insulating sheath 162 in a correspondingly shaped conical widening 154 of the centre opening of the extension sleeve. The threaded portion of the pin 156 projecting outwardly from the extension sleeve 152 carries the one electrical terminal 160. Screwed onto this threaded portion is a nut 158 which presses via a ceramic bushing 159 against the upper end face of the extension sleeve 152. The second terminal 161 is mounted on the extension sleeve 152.

The parts previously described thus have substantially the same structure and the same function as in the embodiment of FIG. 5.

The rod probe 130 is carried by a screw-in member 135 whose centre opening again has a conical portion 141 which however in this case widens outwardly. In this conical widening a conical portion 146 of the probe rod is disposed and is either formed integrally on the outer surface of the metal tube 142 itself or, as in the case of FIG. 5, is formed on a suitable intermediate member. Above the conical portion 146 there is a second oppositely directed conical portion 149 which lies in a cylindrical recess 140 of the screw-in member. The intermediate space between the conical outer surface of the portion 149 and the cylindrical inner surface of the recess 140 is filled by a pressure sleeve 170 with cylindrical outer surface and conical inner surface. The insulating sheath 150 covers continuously also the conical outer surfaces of the portions 146, 149 and the adjoining outer surface of the upper portion of the metal tube 142 up to the upper end thereof. The entire inner surface of the centre opening of the screw-in member 135 is also coated with an insulating layer 171 which also partially covers the lower end face of the screw-in member 135.

The screw-in member 135 is extended upwardly by an extension tube 172 which is coaxial therewith and is welded to the screw-in member 135. In the upper portion of the extension tube 172 an internal thread is formed. Screwed into the internal thread is a pressure ring 174 which carries at the periphery an external thread and the centre opening of which surrounds the upper portion of the metal tube 142. A helical pressure spring 166 bears on the one hand via an annular plate 175 on the pressure ring 174 and on the other via a pressure bushing 176 on the sleeve 170.

The housing 134 containing the electronic circuit is mounted at the upper end of a tubular intermediate member 177 which has at the lower end a threaded portion which is screwed into the internal thread of the extension tube 172.

In this embodiment the helical spring 166, compressed by the screwing-in of the ring 174, exerts a downwardly directed force on the pressure sleeve 170 and as a result firstly the conical outer surface of the portion 146 is pressed into the corresponding conical inner surface of the centre opening of the screw-in member 135 and secondly the pressure sleeve 170 is keyed with the conical outer surface of the portion 149. In this manner a firm completely gas-tight and pressure-tight fit of the rod probe in the screw-in member 135 is achieved which remains even in the case of breakage of the probe rod.

The embodiment of FIG. 6 has compared with that of FIG. 5 the advantage that the rod probe when damaged can be removed upwardly from the screw-in member 135 without having to remove the latter from the opening of the container wall. After the removal of the rod probe a conical closure plug having the same form as the conical portion 146 can be inserted into the centre opening of the screw-in member 135 and then clamped by means of the pressure ring 174. This seals the container in gas-tight manner so that it can be further used until the damaged probe rod can be replaced.

What is claimed is:

1. A capacitance level measuring arrangement for the capacitive measurement of the level in a container, said arrangement comprising:
    a probe extending from the container interior to the container exterior, the probe forming one electrode and the container the other electrode of a capacitor whose capacitance depends on the level in the container, wherein the probe includes two electrical conductors insulated from each other which are electrically connected together at the ends of the conductors facing the container interior and at the ends of which remote from the container interior are provided with electrical terminals separate from each other;
    means for measuring capacitance between one of said terminals on said probe and said container; and
    means for testing continuity between said electrical terminals, the existence of continuity comprising an indication said probe is intact.

2. An arrangement as claimed in claim 1 wherein the probe comprises two conductors formed by a wire bent in hairpin manner.

3. An arrangement as claimed in claim 2 wherein said probe includes a rod-like body of insulating material and said hairpin-shaped wire is embedded in said rod-like body of insulating material.

4. An arrangement as claimed in claim 1 wherein the one conductor is a solid metal rod which is provided with a groove extending over its entire length and the other conductor is an insulated wire inserted into the groove.

5. An arrangement as claimed in claim 4 wherein the metal rod is covered with an insulating sheath.

6. An arrangement as claimed in claim 1 wherein one of said conductors is formed by a metal tube means and the other of said conductors is an insulated wire led through the interior of the metal tube means.

7. An arrangement as claimed in claim 6 wherein the end of the metal tube facing said container interior is sealed in gas-tight manner.

8. An arrangement as claimed in claim 6 or 7 wherein the metal tube is covered with an insulating sheath.

9. An arrangement as claimed in claim 6 where said container includes an opening and where said arrangement includes means for securing said probe with respect to the container, said securing means comprising:
    a metallic, screw-in member screwable into said opening in the container and having a conically widening center opening;
    said metal tube means including a portion having a conical outer surface which is disposed adjacent the conically widening center opening of the screw-in member;
    means for electrically insulating said conical outer surface from the conically widening center opening;
    connection means for pressing said conical outer surface of said portion of the metal tube means and the conically widening center opening of the screw-in member towards one another to thereby secure the probe with respect to the container;
    said metal tube means having an end portion remote from the container with a central opening extending therethrough which includes an outwardly conically tapering portion;
    a closure-pin connected to the end of said wire remote from the container interior, said pin extending through the said central opening of the metal tube means and including a portion projecting outside said metal tube means and a conical portion which is disposed adjacent the outwardly tapering portion of the said central opening of the metal tube means;
    means for electrically insulating said closure-pin and wire from said metal tube means; and
    threaded clamping means for pressing said conical portion of the closure-pin and said outwardly conically tapering portion of the said metal tube means towards one another.

10. An arrangement as claimed in claim 9 wherein a predetermined breakage point is formed at the connection point between said closure pin and the wire.

11. An arrangement as claimed in claim 9 wherein said threaded clamping means comprises:
    an external thread on the closure pin;
    an insulating member; and
    a nut which is screwed onto the external thread and bears via said insulating member on the end face of the metal tube means.

12. An arrangement as claimed in claim 9 wherein one of said electrical terminals is disposed on the end portion of the metal tube means and the other of said electrical terminals is disposed on said outwardly projecting portion of the closure pin.

13. An arrangement as claimed in claim 9 wherein the conical center opening of said screw-in member widens towards the outside of the container and said connection means comprises a screw component which is screwed to the screw-in member and exerts on the metal tube means a pressure force directed towards the container interior.

14. An arrangement as claimed in claim 13 including on the outside of the metal tube means, a conical portion widening towards the container interior a pressure sleeve with conical centre opening fitted onto the conical portion, and said screw component acts on the pressure sleeve.

15. An arrangement as claimed in claim 14 further including a spring inserted between the screw component and the pressure sleeve.

* * * * *